UNITED STATES PATENT OFFICE.

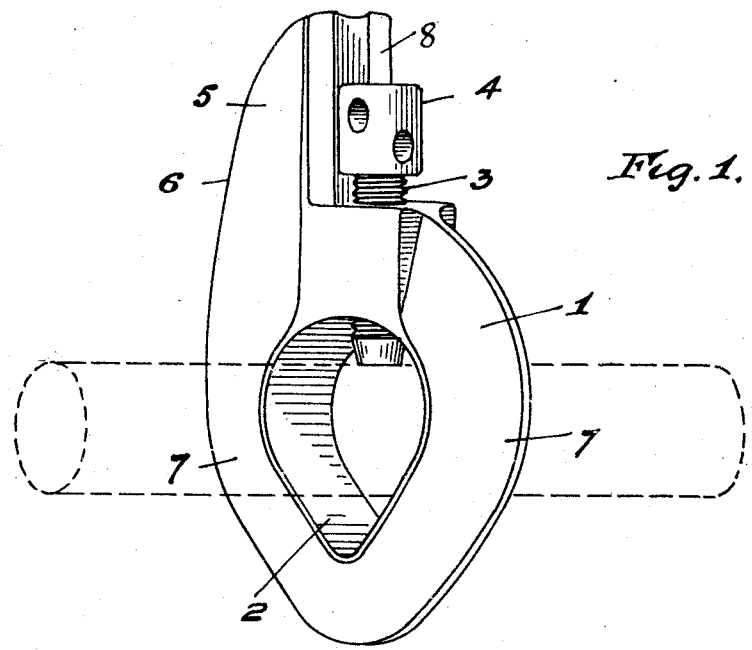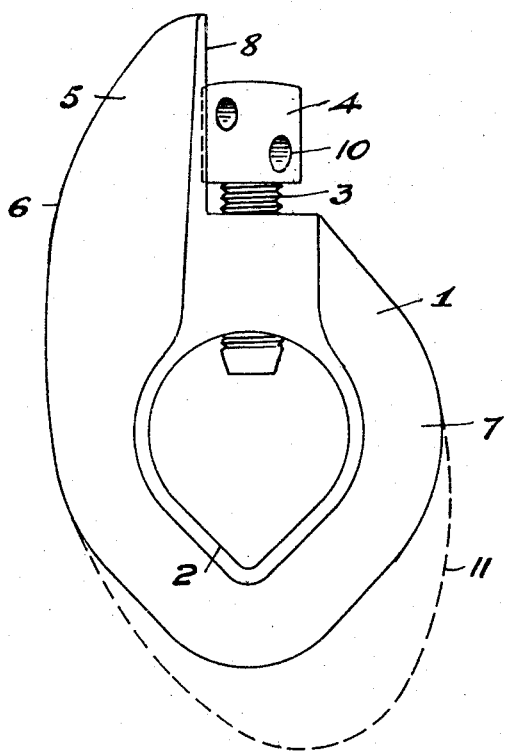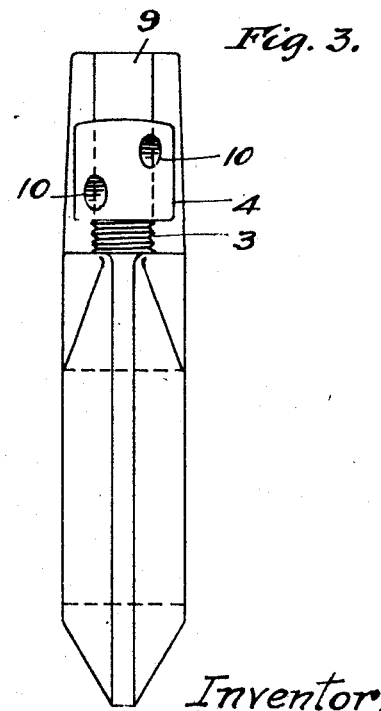

JOHN WILLIAM BARNES, OF ROCK FERRY, CHESHIRE, ENGLAND.

DOG OR DRIVING-CARRIER FOR LATHES OR THE LIKE.

1,365,144.   Specification of Letters Patent.   Patented Jan. 11, 1921.

Application filed July 22, 1919. Serial No. 312,587.

*To all whom it may concern:*

Be it known that I, JOHN WILLIAM BARNES, a subject of the King of Great Britain, and a resident of Rock Ferry, Cheshire, England, have invented certain new and useful Improvements in and Relating to Dogs or Driving-Carriers for Lathes or the like, of which the following is a specification.

The usual dogs or carriers, by means of which bars or the like are gripped and driven in a lathe, consists of an eye piece, a tail adapted to be engaged by a stud on the lathe face plate, and a gripping screw for the bar, the gripping screw being at the opposite side to the tail. It is found that very serious accidents are liable to occur by reason of the projecting head of the gripping screw, this being apt to catch in the clothing, or damage the hand of the worker. The object of the present invention is to avoid this by providing a shield or guard for the projecting screw head on the dog.

According to this invention, the dog consisting of the usual eye piece is unprovided with any special tail or driving element of the usual pattern, the driving element being the gripping screw itself which, with this object, may if desired be made stouter than usual, and in order to prevent the possibility of the projecting head of the gripping screw catching the worker, the eye of the dog is provided integrally with a shield piece which stands up from the body of the eye a distance equal at least to that necessary completely to shroud the gripping screw on one side when the latter is fully unscrewed. This shield is preferably of a cam shaped sweep on one side gradually vanishing into the boss of the eye, or the cam piece may be continued around the eye of the dog to a greater or less extent as an upstanding rib which will have the effect of further strengthening the construction. The other side of the shield is approximately radial and so disposed that the side of the head of the gripping screw beds closely against it, thus forming a support for the screw and taking the driving thrust thereon.

A lathe dog or carrier in accordance with this invention is illustrated in the accompanying drawings, in which Figure 1 is a perspective view of the dog or carrier, Fig. 2, a face view and Fig. 3, an end view.

The dog 1 consists of the usual eye piece tapered at the lower part 2 but unprovided with the usual projecting driving tail at such lower part. The dog is fitted with a gripping screw 3 which itself forms the driving abutment engaged by the projection on the face plate of the lathe. In order to prevent accidents likely to arise from the projecting head 4 of the lathe dog catching in the clothing of the worker, a shield 5 is provided integral with the body of the dog piece, this shield being preferably cam shaped or with a gradually curved sweep 6 on one side vanishing into the boss 7 of the eye. The other side 8 of this shield 5 is made straight, as shown in Figs. 1 and 2, so as to provide a support for the head 4 of the gripping screw and to take the driving thrust thereon. A straight channel 9 curved to the curvature of the screw head 4 may be formed in the face 8 into which channel the head 4 closely beds, as shown in Fig. 2, thus eliminating any possibility of a bending action being set up on the screw 3 when under driving pressure. In order to enable this gripping screw to be rotated, and at the same time insure that the head 4 is always in close contact with the shield so that the latter may take the thrust the head of the screw instead of being made square, as usual, is made round, and tommy holes 10 provided in the head for the insertion of a podger bar.

In order to balance the dog rotatively, a protuberance shown in dotted lines at 11 Fig. 2, may be formed on the opposite side to the shield and the gripping screw, this protuberance being formed as a gradually extending weighting piece, and in order to lighten the shield, instead of it being made throughout of the thickness of the screw head, the main part of the shield may be made comparatively thin, and only increased to the necessary breadth at the face which is in contact with the screw.

With such a device the dog is driven by the bolt or stud on the face plate engaging the head of the gripping screw which in turn engages the radial face 8 of the shield, and so drives the dog, and owing to the strong formation of the shield 5 when arranged as a buttressed cam piece, the dog may be made in cast iron instead of the usual stamped steel forging, and thus cheapen the cost of production.

I claim.

1. A lathe dog or carrier, having a gripping screw which forms the driving abutment, and a shield shrouding the gripping screw head on one side and forming a support therefor to take the driving thrust.

2. A lathe dog or carrier, having a gripping screw which forms the driving abutment, and a shield shrouding the gripping screw head on one side and forming a support therefor to take the driving thrust, said shield being straight on the driving screw side, but curved on the outer side.

3. A lathe dog or carrier, having a gripping screw which forms the driving abutment, said screw having a cylindrical head and holes or the like for turning it, and a shield shrouding the gripping screw head on one side and forming a support therefor to take the driving thrust, said shield being straight on the driving screw side, but curved on the outer side, and having a channel on the straight side into which the screw head engages.

4. A lathe dog or carrier, having a gripping screw which forms the driving abutment, a shield shrouding the gripping screw head on one side and forming a support therefor to take the driving thrust, and a balance weight on the opposite side of the dog to the shield.

In testimony whereof I affix my signature in presence of two witnesses.

JOHN WILLIAM BARNES.

Witnesses:
A. J. DAVIES,
WM. PIERCE.